(12) United States Patent
Zhang et al.

(10) Patent No.: US 8,971,620 B2
(45) Date of Patent: Mar. 3, 2015

(54) DETECTING A LABEL FROM AN IMAGE

(71) Applicant: Alibaba Group Holding Limited, George Town, KY (US)

(72) Inventors: Lun Zhang, Beijing (CN); Rufeng Chu, Beijing (CN); Chunhui Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/021,564

(22) Filed: Sep. 9, 2013

(65) Prior Publication Data

US 2014/0086483 A1   Mar. 27, 2014

(30) Foreign Application Priority Data

Sep. 21, 2012 (CN) .......................... 2012 1 0360774

(51) Int. Cl.
*G06K 9/00* (2006.01)
*G06K 9/64* (2006.01)
*G06K 9/20* (2006.01)
*G06K 9/50* (2006.01)

(52) U.S. Cl.
CPC ................ *G06K 9/64* (2013.01); *G06K 9/2063* (2013.01); *G06K 9/50* (2013.01)
USPC ............................ 382/165; 382/170; 382/105

(58) Field of Classification Search
CPC .......... G06K 9/2063; G06K 9/50; G06K 9/64
USPC ......... 382/170, 140, 105, 120, 201, 203, 195, 382/165
See application file for complete search history.

(56) References Cited

U.S. PATENT DOCUMENTS

| | | | |
|---|---|---|---|
| 4,776,464 A | 10/1988 | Miller et al. | |
| 5,060,980 A | 10/1991 | Johnson et al. | |
| 5,103,489 A | 4/1992 | Miette | |
| 6,360,001 B1 | 3/2002 | Berger et al. | |
| 6,411,386 B1* | 6/2002 | Nishi | 356/401 |
| 7,327,883 B2 | 2/2008 | Polonowski | |
| 7,630,515 B2* | 12/2009 | Takahashi et al. | 382/104 |
| 8,059,896 B2* | 11/2011 | Ito | 382/177 |
| 8,218,821 B2* | 7/2012 | Sefton et al. | 382/105 |
| 8,385,651 B2 | 2/2013 | Zhang et al. | |
| 8,594,422 B2 | 11/2013 | Cimpoi et al. | |
| 2002/0054706 A1* | 5/2002 | Nakatsuka | 382/165 |
| 2007/0058863 A1* | 3/2007 | Boregowda et al. | 382/170 |
| 2007/0098234 A1* | 5/2007 | Fiala | 382/120 |
| 2007/0175073 A1* | 8/2007 | Richard | 40/200 |
| 2009/0092317 A1* | 4/2009 | Nagarajan et al. | 382/173 |
| 2010/0054612 A1* | 3/2010 | Konno | 382/229 |
| 2012/0005222 A1 | 1/2012 | Bhagwan et al. | |

* cited by examiner

*Primary Examiner* — Mekonen Bekele
(74) *Attorney, Agent, or Firm* — Van Pelt, Yi & James LLP

(57) ABSTRACT

Determining a label from an image is disclosed, including: obtaining an image; determining a first portion of the image associated with a special mark; determining a second portion of the image associated with a label based at least in part on the first portion of the image associated with the special mark; and applying character recognition to the second portion of the image associated with the label to determine a value associated with the label.

20 Claims, 8 Drawing Sheets

DETECTING A LABEL FROM AN IMAGE

CROSS-REFERENCE TO OTHER APPLICATIONS

This application claims priority to People's Republic of China Patent Application No. 201210360774.6 entitled A MOBILE TERMINAL-BASED LABEL RECOGNITION AND PROCESSING METHOD AND SYSTEM, filed Sep. 21, 2012 which is incorporated herein by reference for all purposes.

FIELD OF THE INVENTION

The present patent application relates to the field of character recognition. In particular, the present application relates to techniques for label recognition.

BACKGROUND OF THE INVENTION

Optical character recognition (OCR) technology refers to the process whereby electronic equipment (e.g., a scanner or digital camera) examines printed images by detecting patterns of darkness and brightness of the images, determining their shapes, and then using a character recognition technique to translate the shapes into computer recognized characters. At a high level, OCR refers to the process of obtaining text materials and processing the images of the text materials to determine character and layout information. Obtaining text materials may include scanning, photographing, and other such forms of optical input. Various pattern recognition algorithms may be used to analyze the morphological features of text and determine the standard codes of Chinese characters. For example, a text source is scanned by a device and an image file is generated. The image file undergoes image processing, during which the layout of the image file is demarcated (e.g., layout analysis is performed including layout interpreting, character segmentation, normalization, etc.) to separate the image file into different sections for separate, sequential processing. For example, the image file is separated into various portions, where each portion includes a character to be recognized. A character is then recognized from each portion of the image file. For example, the characters may comprise Chinese ("汉字" ["Chinese characters"]) or English. The recognized text may be edited and revised.

The objective of an OCR recognition system is to convert images so that text characters may be recognized from the images. If characters may be recognized from the images, then the images are converted into computer text, thus decreasing the amount of image information that is stored and reducing storage space or enabling re-use, analysis, etc. of recognized text while conserving human effort and input time.

FIG. 1 is a diagram showing an example of a conventional text recognition system. In the example, system 100 includes image conversion and input module 101, image pre-processing module 103, character feature extraction module 105, comparison recognition module 107, and correction and results output module 109.

Image conversion and input module 101 is configured to capture the target subject as an image file. An image file may comprise a black-or-white binary image or a greyscale or color image. The target subject may be captured by an optical device such as a scanner, fax machine, or any photography equipment. The captured image file(s) are input into a computer. As technology advances, scanners, cameras, and other input devices are becoming more finely crafted and more compact, of higher quality, and easier to install. Moreover, the high resolution of such input devices has led to sharper images and higher speeds, which are spurring improvements in OCR processing efficiency.

Image pre-processing module 103 is configured to process the input image files into individual and independent images, where each image comprises a character. Image pre-processing module 103 is also configured to perform image normalization, noise elimination, image correction, and other image processing, as well as file pre-processing entailing image-text analysis and text line and character separation. Image processing is already a mature technology, but the various kinds of image file pre-processing have their advantages and disadvantages. Generally, the picture, form, and text regions of an image are first separated from each other. Even the article's layout direction, the article outline, and its main body of text may be separated. Moreover, character fonts and sizes are determined.

Character feature extraction module 105 is configured to extract features of the image file. Which features are extracted and how they are used directly affect the quality of character recognition. The "features" are used to distinguish among characters to be recognized. For example, two different types of features may be used. The first type of features is statistical features, e.g., the black-white pixel ratio in an image. When a text region is divided into several portions, the combination of the black-white pixel ratios corresponding to the different portions of the image file constitutes a spatial, numerical value vector. The second type of features is structural features. For example, after converting a portion of an image associated with a character into thin lines, the system obtains quantities and locations of the character stroke endpoints and intersection points (e.g., stroke segments) to use as features.

After features have been extracted from the input text, these (statistical and/or structural) features are compared with features stored in a comparison database or a feature database. The database includes feature information associated with characters to be recognized from the image file. The feature information included in the database was determined by the same extraction method that was performed on the image file.

Comparison recognition module 107 is configured to make comparisons between the features extracted from the image file and feature information of characters stored in the comparison database. If a match is found between features extracted for a portion of the image file to feature information stored in the database, then that portion of the image is recognized as the character corresponding to the matching stored set of feature information. In some instances, mathematical operations may be performed on the features during the comparison. For example, mathematical distance may be determined between the features extracted from the image file and a set of feature information corresponding to a character stored in the database. The following are some example types of comparison techniques: Euclidean space comparative technique, relaxation comparative technique, dynamic programming (DP) comparative technique, a database establishment and contrasting technique according to analogue neural networks, and the HMM (Hidden Markov Model) technique. Additionally, human experts may facilitate in the comparison. One or more types of comparison techniques may be used to achieve the optimum result.

Correction and results output module 109 is configured to present the character(s) recognized from the image file at a user interface to a user.

When a product is being purchased, the bar code on the product cannot be recognized by the naked eye but only by specialized reading equipment. In another example, people typically use a digital or text code to index products or other subject matters and to form catalogues, series, codes/numbers, and other such labels. For example, products have product codes (or may be called product numbers, etc.). A product code may include characters such as numbers and text, and images (e.g., the manufacturer's logo). A product code may be used to uniquely identify a certain product. The product code may appear around, near, or on top of common product images that are displayed on Internet or mobile phone advertisements or on marketed physical products. Conventional systems are unable to directly recognize the product codes included in images. A demand has also arisen for capturing and recognizing product codes using mobile platforms such as mobile phones or other mobile devices. Generally, with regard to an image that is based on a scanned or photographed advertisement, it is possible to use conventional OCR technology to recognize some of the characters. However, conventionally, existing image pre-processing module 103 generally uses a layout analysis technique to differentiate image and text sections in the image. This technique applies to text layouts with a certain degree of structural information. However, in images such as product advertisements, where a product code appears near, around, or over one or more graphics, the text and graphics are more difficult to separate using conventional OCR technology and therefore it becomes more difficult to recognize the text from the image.

BRIEF DESCRIPTION OF THE DRAWINGS

Various embodiments of the invention are disclosed in the following detailed description and the accompanying drawings.

DETAILED DESCRIPTION

Figure 1:
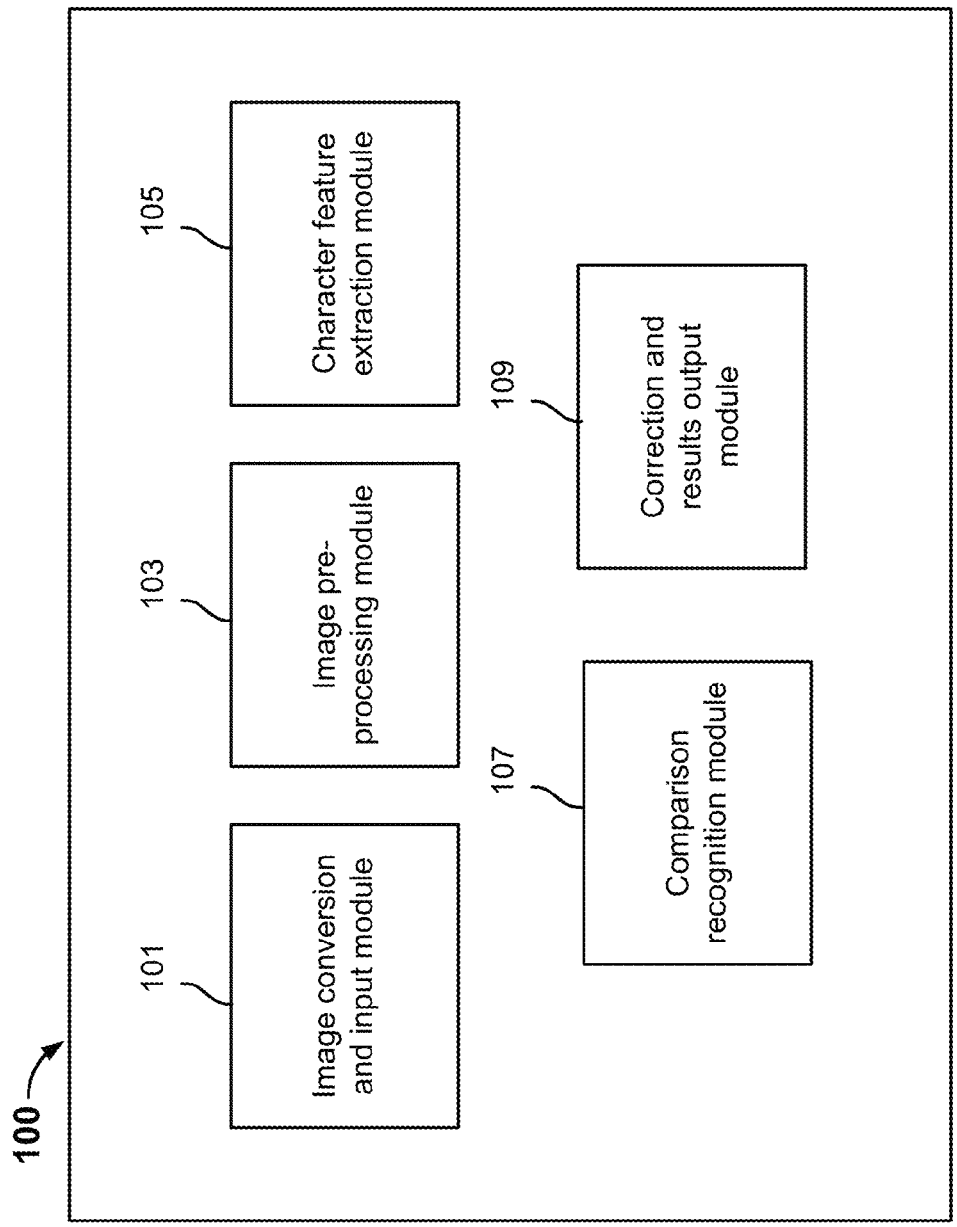
FIG. 1 is a diagram showing an example of a conventional text recognition system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of detecting a label are described herein. An image is received. For example, the image is associated with a product. The image is associated with an advertisement for the product, for example. In various embodiments, the image was specially designed to include a special mark that is located near a label. Therefore, once the special mark on the image is located, the location of the special mark may be used as a reference nearby which the label may be found. An example of the label is a product label that can be used to uniquely identify a product associated with the image. A product label is only one example of a label and the label may comprise any type of identifying information (e.g., a code, a name, or the ID of a certificate of identification). A portion of the image that includes the special mark is determined based at least in part on a predefined special mark pattern. Once the special mark of the image is determined, the area of the image near the location of the special mark is searched for a portion of the image that is associated with the label. Optical character recognition may be performed on the portion of the image that is associated with the label to determine one or more characters/graphics that are associated with the label. For example, the recognized content from the portion of the image associated with a product label may be used as a search query for further information on the product associated with the image.

Figure 2:
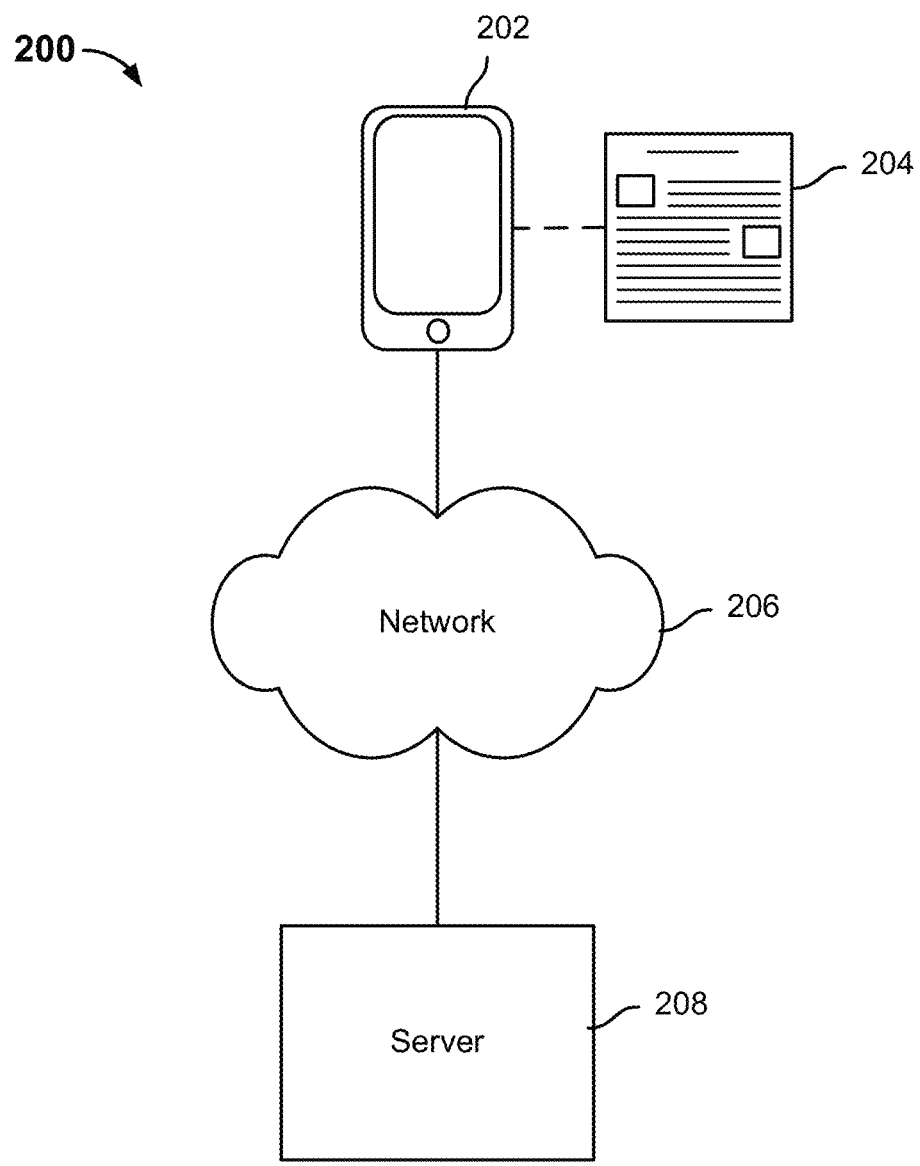
FIG. 2 is a diagram showing an embodiment of a system for detecting a label from an image.

FIG. 2 is a diagram showing an embodiment of a system for detecting a label from an image. In the example, system 200 includes device 202, image 204, network 206, and server 208. Network 206 includes high-speed data networks and/or telecommunications networks. Device 202 is configured to communicate to server 208 over network 206.

Device 202 is configured to recognize a label from an image, such as image 204, which is received at device 202. Examples of device 202 include a desktop computer, a laptop computer, a smart phone, a mobile device, and/or other types of computing devices. Device 202 may receive image 204 through taking a photograph via a camera function of a physical surface (e.g., an advertisement), making a scan of a physical surface, downloading image 204 from a webpage (e.g., associated with a website hosted by server 208), or through other appropriate techniques. Image 204 (or the physical surface from which it was derived) was designed to include a special mark (not shown in the example of FIG. 1) and a label (not shown in the example of FIG. 1). The special mark may comprise any graphic that matches a predetermined special mark pattern and is also designed to be located near the location of the label on image 204. A user using device 202 may desire to recognize the value of the label of image 204 so that device 202 may process the recognized values (e.g., perform a search using such values as a search query at a search engine supported by server 208).

Image 204 may include a combination of graphics and/or text such that the location of the label is not easily ascertainable. However, as will be further described below, device 202 (or an application executing at device 202) is configured to first locate a portion of image 204 associated with the special mark and then use the special mark as a reference to begin a search for the portion of image 204 associated with the label. By using techniques to find the special mark of image 204 first and then using the special mark as a reference to find the label, the label of image 204 may be efficiently located and recognized.

Figure 3:
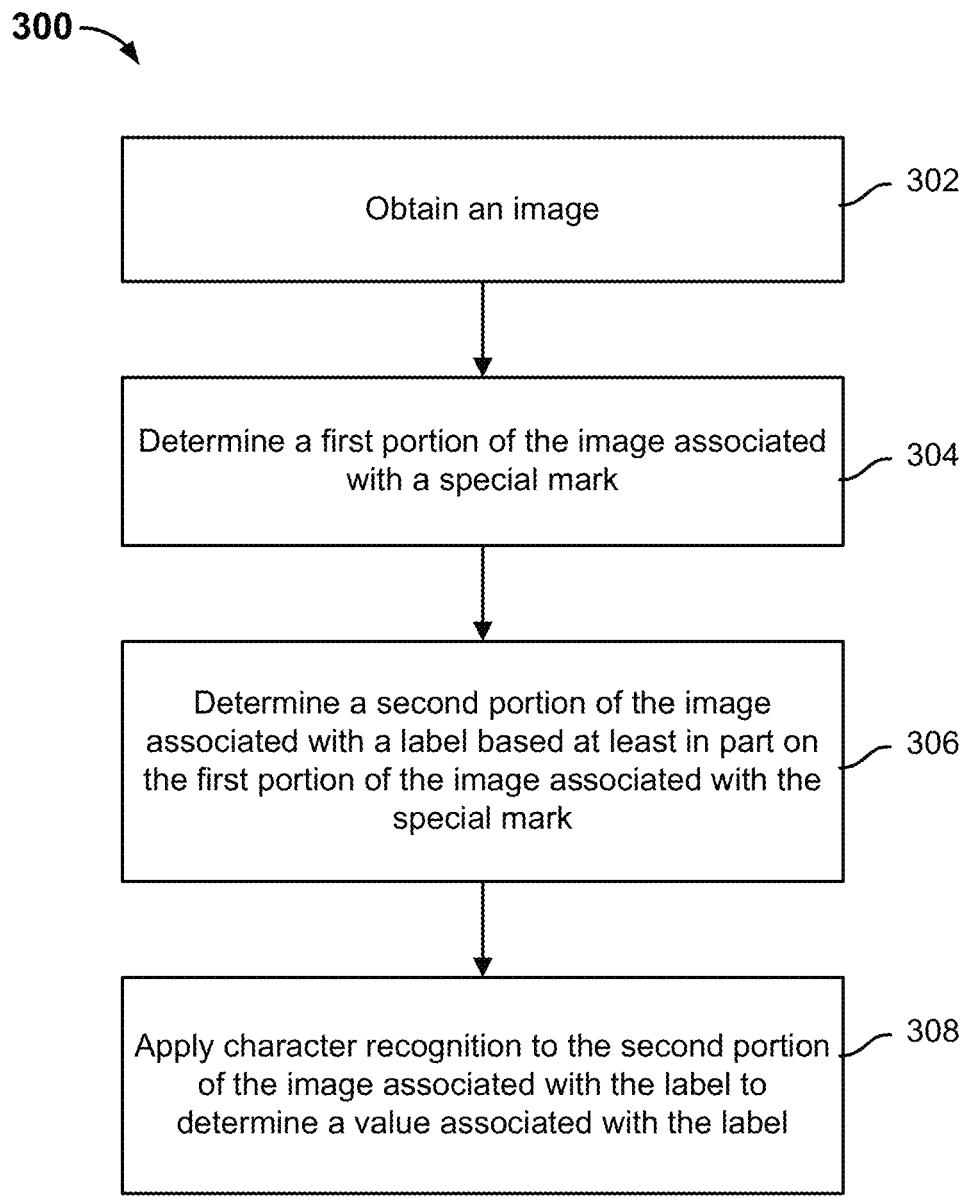
FIG. 3 is a flow diagram showing an embodiment of a process for detecting a label from an image.

FIG. 3 is a flow diagram showing an embodiment of a process for detecting a label from an image. In some embodiments, process 300 is implemented at device 202 of FIG. 2.

Process 200 enables the detection of a label from an image that was designed to include a special mark that is located near a label.

At 302, an image is obtained. The image can be downloaded from a website, downloaded from a message, and/or captured via a device. For example, the image may be captured through a scanner, a camera. In various embodiments, an obtained image is associated with one or more products and was designed to include a product label. For example, the image can be an advertisement and the product label may comprise a product code that (uniquely) identifies the product (s). For example, the product code includes alphanumeric characters and/or other symbols. An image may comprise a combination of graphics and text, at least a first portion of which comprises a special mark and a second portion of which comprises the label. Once the label is recognized, the label may be used in a search to obtain more information associated with the image.

At 304, a first portion of the image associated with a special mark is determined. In various embodiments, a special mark that is included in a portion/location of the image is first determined. Once the special mark is determined, the area of the image near the location of the special mark is searched for the label. The special mark is used to indicate an approximate location of the label on an image so that the label may be identified from the image that may include various graphics and/or text that are not related to the label. Because images such as those described herein are designed to have a special mark with the label, if a label is included in the image, then so is a special mark (e.g., beside the label, above the label, below the label, and/or in another location relative to the location of the special mark). For example, the special mark and the label may be integrated with the other content of the image or printed onto the image (e.g., over other content of the image).

Figure 4:
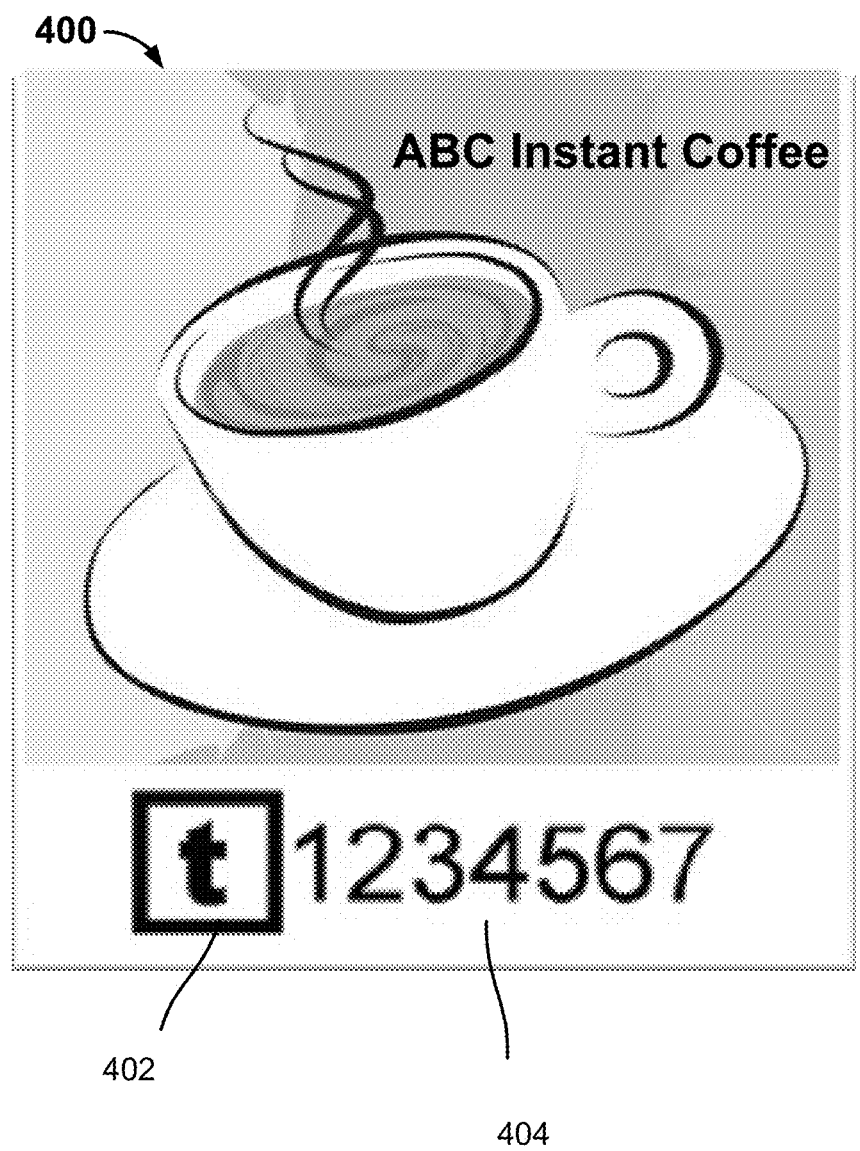
FIG. 4 shows an example of a special mark within an image.

The special mark may be any graphic that is created based on one or more special mark patterns. In various embodiments, the one or more special mark patterns are set by the designers of the special mark and/or image. FIG. 4 shows an example of a special mark within an image. In the example, image 400 is an image that was designed to include a special mark that was located near a product label. Image 400 comprises an advertisement for the product of "ABC Instant Coffee." As shown in the example, special mark 402, which is associated with a first portion of image 400, is a graphic that comprises a rectangle with black boundaries and a character "t" that is enclosed in the rectangle. Product label 404, which is associated with a second portion of image 400, comprises a product code with value "1234567." Image 400 comprises a combination of text and graphics that are not easy to separate such that product label 404 cannot be easily identified. However, a process such as process 300 may be used to first determine the location within image 400 of special mark 402 and then to use the location of special mark 402 to find the nearby product label 404.

Returning to process 300 of FIG. 3, a special mark may be detected in the image based on the one or more special mark patterns. In some embodiments, one or more special mark patterns dictate that the special mark comprises a shape (e.g., rectangle) with black boundaries and/or encloses a designated content. For example, special mark 402 of FIG. 4 is an example of a special mark that comprises a shape (e.g., rectangle) with black boundaries and that also encloses a designated content (the character "t"). In some embodiments, one or more special mark patterns dictate that the special mark comprises a portion of the image that includes a shape (e.g., rectangle) with black boundaries and having at least one line (e.g., row or column) of pixels that has a black-white pixel ratio that matches a predetermined black-white pixel ratio. As used herein, a "black-white pixel ratio" comprises a ratio of a number of black pixels to a number of white pixels. In some embodiments, one or more special mark patterns dictate that the special mark comprises a portion of the image that comprises a shape with black boundaries, the black boundaries enclose a designated content, and the shape includes the black boundaries that have at least one line (e.g., row or column) of pixels that matches each of one or more predetermined black-white pixel ratios. Furthermore, one or more special mark patterns dictate that the special mark conforms to any specified attributes, such as, for example, the structures and/or features (e.g., length, width, size, dimensions, direction, position, color, grayscale, brightness, etc.) of characters associated with the special mark; text, or images of codes (e.g., such as digital codes, text codes, and image codes (such as a merchant logo)) associated with the special mark. Because the special mark is designed based at least in part on one or more special mark patterns, a special mark of an image may be determined as a portion of the image that satisfies/matches such special mark patterns.

In a first example, if the one or more special mark patterns dictated that the special mark comprise a shape (e.g., rectangle) with black boundaries and/or encloses a designated content, then the special mark of the image may be determined by first detecting a shape in the image that is associated with black boundaries that match a special mark pattern. Then, once the shape with the black boundary is detected, the area enclosed by the black boundary is checked for a designated content that matches a special mark pattern. Once the black boundary with the enclosed content that matches one or more special mark patterns has been found in the image, then the portion of the image that includes the black boundary and enclosed content is determined to comprise the special mark. Then, the portion of the image determined to comprise the special mark is used to locate another portion of the image that comprises a label that is nearby on the image. Further details associated with detecting a special mark that matches the one or more special mark patterns associated with the special mark comprising a shape (e.g., rectangle) with black boundaries and/or encloses a designated content are described with the examples of FIG. 4 above and FIG. 5 below.

In a second example, if the one or more special mark patterns dictate that the special mark comprises a portion of the image that includes a shape (e.g., rectangle) with black boundaries and having at least one line (e.g., row or column) of pixels that matches each of one or more predetermined black-white pixel ratios, then the special mark of the image may be determined by first detecting a shape in the image that is associated with a black boundary that matches a special mark pattern. Then, once the shape with the black boundary is detected, it is determined whether one or more lines of pixels within the portion of image associated with the shape (including the black boundary) have black-white pixel ratios that match corresponding ones of the predetermined black-white pixel ratios. For example, the line of pixels within the shape that matches the predetermined black-white pixel ratio may comprise contiguous or non-contiguous pixels. The line of pixels within the shape that matches the predetermined black-white pixel ratio may include pixels that are of colors other than black and white (so long as the ratio of black to white pixels in the line matches the predetermined black-white pixel ratio). In some embodiments, once the shape with the black boundary that matches the special mark is determined, the special mark detection process proceeds to scan the pixels included in the shape, in a line-by-line manner to determine whether any one or more lines of such pixels match a predetermined black-white pixel ratio of a special mark pattern. In some embodiments, a special mark pattern may include a different predetermined black-white pixel ratio for each of one or more lines of pixels. Further details associated with detecting a special mark that matches the one or more special mark patterns associated with the special mark comprising a shape (e.g., rectangle) with black boundaries and having at least one line (e.g., row or column) of pixels that matches a predetermined black-white pixel ratio are described with the examples of FIGS. 6 and 7 below.

At 306, a second portion of the image associated with a label is located based at least in part on the first portion of the image associated with the special mark. As mentioned above, a special mark is designed to be close to a label in an image. By using the location of the detected special mark as a reference near which to search for the label, the search for the label can be expedited (as compared to searching the entire image for a label and/or starting a search for the label with no such reference). In some embodiments, the area of the image in one or more directions away from the detected special mark is searched for the label. For example, known techniques of edge detection, straight-line fitting, and template matching may be used to locate a portion of the image associated with the label near the portion of the image associated with the special mark. For example, an area near (e.g., within a predetermined radius from or a particular square area around) the detected special mark may be searched for a portion of the image that matches a template of a label (e.g., the template may indicate the dimensions of the label and/or the number of values included in a label). The portion of the image that matches the template is determined to include the characters of the label.

At 308, character recognition is applied to the second portion of the image associated with the label to determine a value associated with the label. The portion of the image near the detected special mark that is determined to include the label is subjected to a character recognition process. Any known OCR technique may be used to determine the label value from this portion of the image. Numbers, texts, and/or other types of characters or symbols may be recognized. In some embodiments, the portion of the image associated with the label (e.g., the portion of the image that matches a label template) is first extracted from the image before subjecting the extracted portion to a character recognition process. Extracting the portion of the image associated with the label serves to isolate the label from other content from the image and potentially improve the character recognition results. For example, the label may comprise a product code that is used to uniquely identify the product in a database. In some embodiments, the recognized label value (e.g., that comprises characters and/or symbols) is submitted as a search query to obtain more information about the image. The search results may be presented to a user via a user interface.

In some embodiments, after 308, it is determined whether another label is to be recognized from the image. For example, process 300 may be performed again to determine whether another special mark, different from any other found from the image, may be found. If so, then process 300 may repeated and another corresponding label may be located in the same image and recognized.

Figure 5:
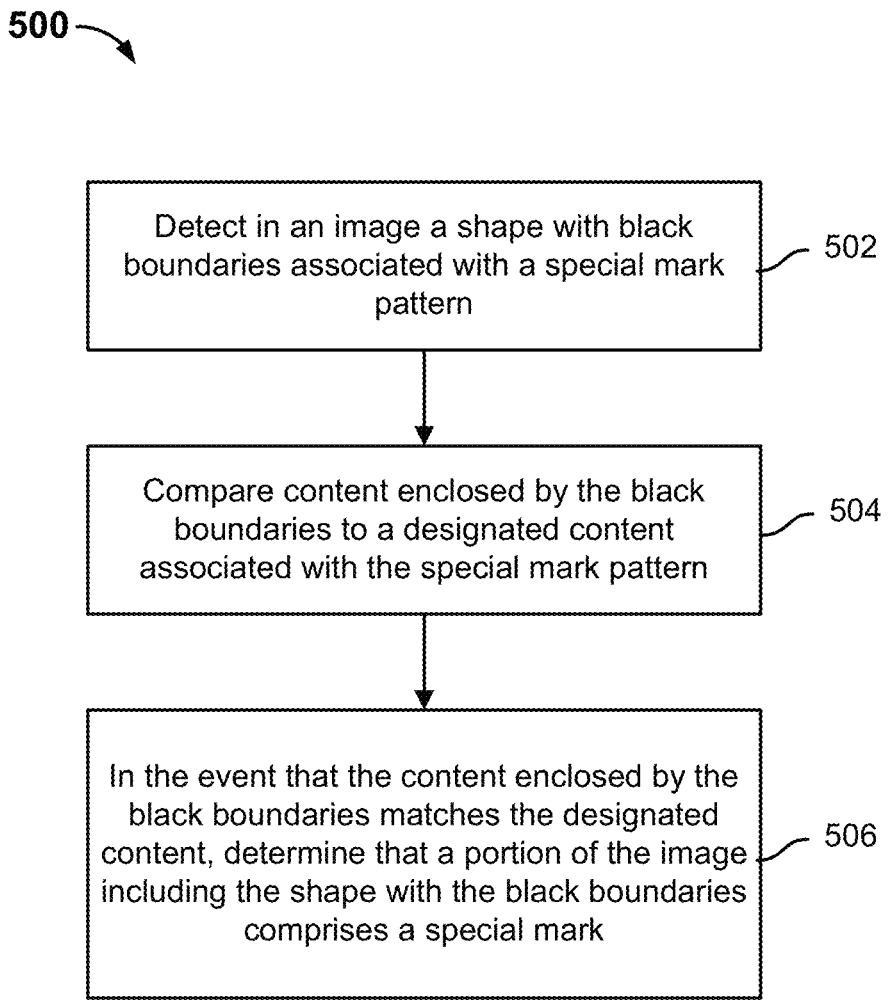
FIG. 5 is a flow diagram showing an example of a process of detecting a special mark in an image.

FIG. 5 is a flow diagram showing an example of a process of detecting a special mark in an image. In some embodiments, process 500 is implemented at device 202 of FIG. 2.

Process 500 is one example of a process that may be used to detect in an image a special mark that was designed to match a special mark pattern that dictates a shape (e.g., rectangle) with black boundaries and/or encloses a designated content. The image is one from which a label is desired to be recognized.

At 502, a shape with black boundaries associated with a special mark pattern is detected in an image. For example, in an image, a shape that is demarcated from other content in the image by a black boundary is found (e.g., using edge detection). Referring to the example of FIG. 4, special mark 402 includes a rectangle that has black boundaries. If process 500 were applied to image 400 of FIG. 4, then the rectangle with the black boundaries would be detected at step 502.

Returning to FIG. 5, at 504, content enclosed by the black boundaries is compared to a designated content associated with the special mark pattern. The content (e.g., character, number, or symbol) that is enclosed in the black boundaries is extracted (e.g., recognized) and compared to the designated content associated with the special mark pattern.

At 506, in the event that the content enclosed by the black boundaries matches the designated content, it is determined that a portion of the image including the shape with the black boundaries comprises a special mark. In the event that there is a match between the content that is enclosed in the black boundaries and the designated content associated with the special mark pattern, then the portion of the image that includes the shape with black boundaries is determined to be a special mark. However, if there is no match between the content that is enclosed in the black boundaries and the designated content associated with the special mark pattern, then the portion of the image that includes the shape with black boundaries is not determined to be a special mark. Referring to the example of FIG. 4, special mark 402 shows that the character "t" is enclosed within the black boundaries of the rectangle. If process 500 were applied to image 400 of FIG. 4, then the rectangle with the black boundaries of special mark 402 would be determined to be a special mark if the character "t" matched the designated content of the special mark pattern. If the special mark is determined, then a label of the image is searched for in the area surrounding the special mark.

Figure 6:
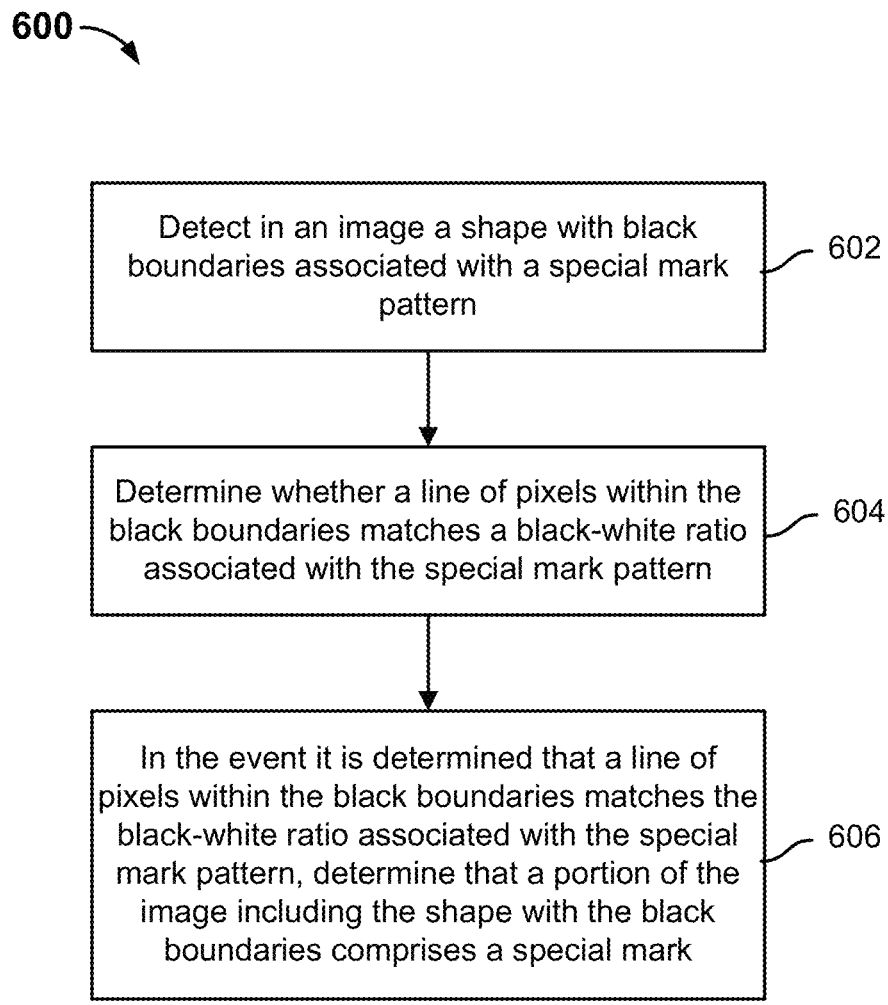
FIG. 6 is a flow diagram showing an example of a process of detecting a special mark in an image.

FIG. 6 is a flow diagram showing an example of a process of detecting a special mark in an image. In some embodiments, process 600 is implemented at device 202 of FIG. 2.

Process 600 is one example of a process that may be used to detect in an image a special mark that was designed to match a special mark pattern that dictates the special mark comprising a portion of the image that includes a shape (e.g., rectangle) with black boundaries and having at least one line (e.g., row or column) of pixels that matches a predetermined black-white pixel ratio. The image is one from which a label is desired to be recognized.

At 602, a shape with black boundaries associated with a special mark pattern is detected in an image. For example, in an image, a shape that is demarcated from other content in the image by a black boundary is found (e.g., using edge detection).

At 604, it is determined whether a line of pixels within the black boundaries matches a black-white pixel ratio associated with the special mark pattern. A special mark pattern may dictate a black-white pixel ratio for each of one or more lines of pixels within a portion of an image associated with a special mark. A line of pixels may refer to a row of pixels or a column of pixels, which may be specified in the special mark pattern. For example, if black boundaries are detected in 602, then each line of pixels within the detected black boundaries (and including the boundaries themselves) may be checked to determine if at least one of such lines of pixels matches each black-white pixel ratio associated with a special mark pattern. For example, if multiple black-white pixel ratios were defined for a special mark pattern, the lines of pixels within the detected black boundaries that match respective ones of the black-white pixel ratios may be adjacent or non-adjacent to each other.

At 606, in the event it is determined that a line of pixels within the black boundaries matches the black-white pixel ratio associated with the special mark pattern, it is determined that a portion of the image including the shape with the black boundaries comprises a special mark.

Figure 7:
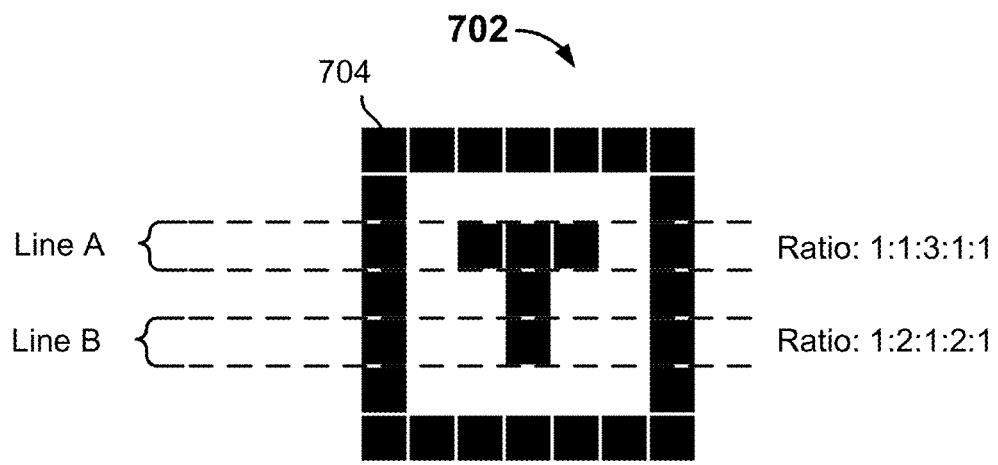
FIG. 7 includes portion of an image 702 of which each pixel is represented by a square in the diagram, such as square 704.

An example of applying process 600 is described with respect to the example of FIG. 7. FIG. 7 incldes portion of an image 702 of which each pixel is represented by a square in the diagram, such as square 704. In the example, a special mark pattern dictates that the special mark includes a square shape with black boundaries, a first black-white pixel ratio associated with a first line of pixels, and a second black-white pixel ratio associated with a second line of pixels. As described above, a black-white pixel ratio describes a number of black pixels to a number of white pixels. In applying 602 of process 600 of FIG. 6, portion of an image 702 is detected because it comprises the square shape with black boundaries. The first black-white pixel ratio of the example comprises 1:1:3:1:1, which means that one line of pixels within the black boundaries of the shape detected in 602 of process 600 must include the pixel ratio of one black pixel, one white pixel, three black pixels, one white pixel, and one black pixel. The second black-white pixel ratio of the example comprises 1:2:1:2:1, which means that another line of pixels within the black boundaries of the shape detected in 602 of process 600 must include the pixel ratio of one black pixel, two white pixels, one black pixel, two white pixels, and one black pixel. The two lines of pixels corresponding to the first and second black-white pixel ratios may or may not be adjacent to each other. In applying 602 of process 600 of FIG. 6, each row of pixels of portion of an image 702 is examined (e.g., line-by-line) to determine whether a first row of pixels matches the first black-white pixel ratio (1:1:3:1:1) of the special mark pattern and whether a second row of pixels matches the second black-white pixel ratio (1:2:1:2:1) of the special mark pattern. As shown in the example, Line A of pixels within (and including) the black boundaries of portion of an image 702 matches the first black-white pixel ratio (1:1:3:1:1) of the special mark pattern because from left-to-right (or right-to-left) in Line A, one black pixel is followed by one white pixel, which is followed by three black pixels, which is followed by one white pixel, which is followed by one black pixel. Line B of pixels matches the second black-white pixel ratio (1:2:1:2:1) of the special mark pattern because from left-to-right (or right-to-left) in Line B, one black pixel is followed by two white pixels, which is followed by one black pixel, which is followed by two white pixels, which is followed by one black pixel. Because Line A and Line B of portion of an image 702 are found to respectively match the two black-white pixel ratios defined in the special mark pattern, according to 606 of process 600 of FIG. 6, portion of an image 702 is determined to be a special mark.

More than one line of pixels including the black boundaries may match a black-white pixel ratio of a special mark pattern but at least one line of pixels needs to match to satisfy the special mark pattern. The black-white pixel ratio is simplified such that a line of pixels (not shown), for example, comprising five black pixels followed by five white pixels, which is followed by then fifteen black pixels, which is followed by five white pixels, which is followed by five black pixels still conforms to the ratio of 1:1:3:1:1.

While the example special mark pattern above includes two black-white pixel ratios corresponding to two lines of pixels, a special mark pattern may include zero or more black-white pixel ratios corresponding to an equivalent number of lines of pixels.

Figure 8:
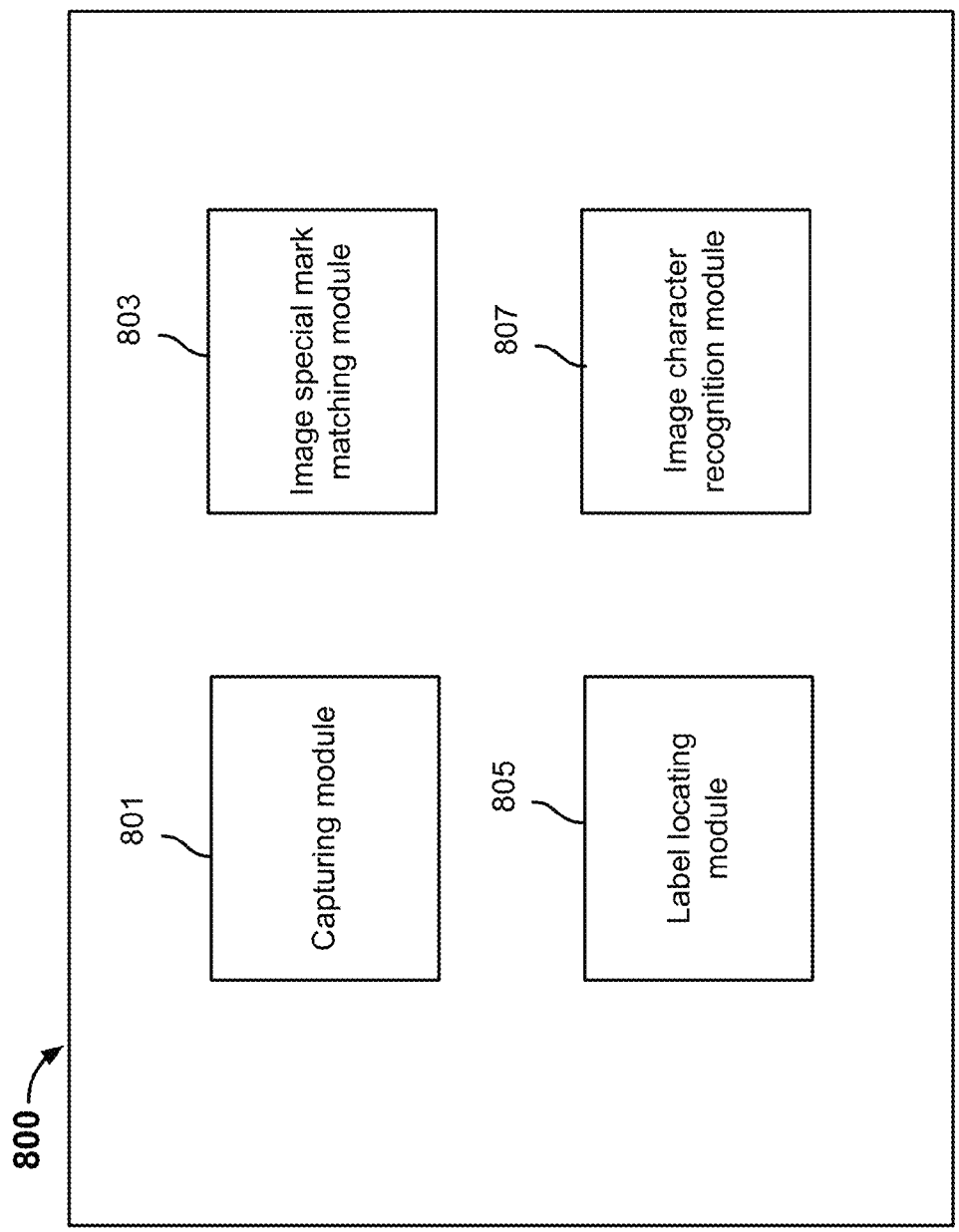
FIG. 8 is a diagram showing an embodiment of a system for detecting a label from an image.

FIG. 8 is a diagram showing an embodiment of a system for detecting a label from an image. In the example, system 800 includes: capturing module 801, image special mark matching module 803, label locating module 805, and image character recognition module 807.

The modules can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Image capturing module 801 is configured to determine an image associated with a. For example, image capture module 801 can receive an image via a camera, a scanner, via downloading the image from a message and/or webpage, or through any other appropriate techniques. For example, capturing module 801 is configured to take a photograph of an advertisement for a product where the captured image is the generated photograph.

Image special mark matching module 803 is configured to determine a first portion of the image associated with a special mark. Image special mark matching module 803 is configured to locate a special mark, if one exists, on the image based on one or more special mark patterns. Image special mark matching module 803 is configured to identify a portion of the image that satisfies one or more mark patterns, as described above. Image special mark matching module 803 may use the example techniques of edge detection and straight-line fitting to identify the portion of the image associated with the special mark.

Label locating module 805 is configured to locate a second portion of the image associated with a label based on the first portion of the image associated with the special mark. The label may be searched for in an area of the image that is associated with the detected special mark. For example, a template associated with the label can be used to locate a portion of the image associated with the label. In some embodiments, label locating module 805 is configured to extract the portion of the image associated with the label out of the image.

Image character recognition module 807 is configured to perform character recognition on the portion of the image associated with the label that was determined by label locating module 805. In some embodiments, image character recognition module 807 is configured to receive the extracted portion of the image associated with the label and perform character recognition. Character recognition may be performed using a known OCR technique. In some embodiments, image character recognition module 807 is configured to perform a search using the characters recognized from the label and display the search results (associated with a product associated with the label) to the user via a user interface. In some embodiments, image character recognition module 807 is configured to input the characters recognized from the label into another system for further processing.

The various embodiments in this description are generally described in a progressive manner. The explanation of each embodiment focuses on areas of difference from the other embodiments, and the descriptions thereof may be mutually referenced for portions of the embodiments that are identical or similar.

The present application can be described in the general context of computer executable commands executed by a computer, such as a program module or unit. Generally, program modules or units include routines, programs, objects, components, data structures, etc. to execute specific tasks or implement specific abstract data types. Generally, program modules or units can be realized through software, hardware, or combinations of the two. The present application can also be carried out in distributed computing environments; in such distributed computing environments, tasks are executed by remote processing equipment connected via communication networks. In distributed computing environments, program modules or units can be located in storage media at local or remote computers that include storage equipment.

This document has employed specific examples to expound the principles and forms of implementation of the present application. The above embodiment explanations are only meant to aid in comprehension of the methods of the present application and of its main concepts. Moreover, a person with general skill in the art would, on the basis of the concepts of the present application, be able to make modifications to specific forms of implementation and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  one or more processors configured to:
    obtain an image;
    determine a first portion of the image associated with a special mark;
    determine a second portion of the image associated with a label based at least in part on the first portion of the image associated with the special mark, wherein to determine the second portion of the image associated with the label based at least in part on the first portion of the image associated with the special mark includes to search for the second portion of the image associated with the label in an area of the image near a location of the first portion of the image associated with the special mark; and
    apply character recognition to the second portion of the image associated with the label to determine a value associated with the label; and
  one or more memories coupled to the one or more processors and configured to provide the one or more processors with instructions.

2. The system of claim 1, wherein the image is obtained based at least in part on one or more of the following: receiving the image via a camera, receiving the image via a scanner, and downloading the image.

3. The system of claim 1, wherein the image is associated with one or more products.

4. The system of claim 3, wherein the label includes identifying information associated with the one or more products.

5. The system of claim 1, wherein to determine the first portion of the image associated with the special mark includes to:
  detect in the image a shape with black boundaries associated with a special mark pattern;
  compare content enclosed by the black boundaries to a designated content associated with the special mark pattern; and
  in the event that the content enclosed by the black boundaries matches the designated content, determine that a portion of the image including the shape with the black boundaries comprises the first portion of the image associated with the special mark.

6. The system of claim 1, wherein to determine the first portion of the image associated with the special mark includes to:
  detect in the image a shape with black boundaries associated with a special mark pattern;
  determine whether a line of pixels within the black boundaries matches a black-white pixel ratio associated with the special mark pattern; and
  in the event it is determined that the line of pixels within the black boundaries matches the black-white pixel ratio associated with the special mark pattern, determine that a portion of the image including the shape with the black boundaries comprises the first portion of the image associated with the special mark.

7. The system of claim 1, wherein the one or more processors are further configured, prior to applying character recognition to the second portion of the image associated with the label, to extract the second portion of the image associated with the label from the image.

8. A method, comprising:
  obtaining an image;
  determining, using one or more processors, a first portion of the image associated with a special mark;
  determining a second portion of the image associated with a label based at least in part on the first portion of the image associated with the special mark, wherein determining the second portion of the image associated with the label based at least in part on the first portion of the image associated with the special mark includes searching for the second portion of the image associated with the label in an area of the image near a location of the first portion of the image associated with the special mark; and
  applying character recognition to the second portion of the image associated with the label to determine a value associated with the label.

9. The method of claim 8, wherein the image is obtained based at least in part on one or more of the following: receiving the image via a camera, receiving the image via a scanner, and downloading the image.

10. The method of claim 8, wherein the image is associated with one or more products.

11. The method of claim 10, wherein the label includes identifying information associated with the one or more products.

12. The method of claim 8, wherein determining the first portion of the image associated with the special mark includes:
 detecting in the image a shape with black boundaries associated with a special mark pattern;
 comparing content enclosed by the black boundaries to a designated content associated with the special mark pattern; and
 in the event that the content enclosed by the black boundaries matches the designated content, determining that a portion of the image including the shape with the black boundaries comprises the first portion of the image associated with the special mark.

13. The method of claim 8, wherein determining the first portion of the image associated with the special mark includes:
 detecting in the image a shape with black boundaries associated with a special mark pattern;
 determining whether a line of pixels within the black boundaries matches a black-white pixel ratio associated with the special mark pattern; and
 in the event it is determined that the line of pixels within the black boundaries matches the black-white pixel ratio associated with the special mark pattern, determining that a portion of the image including the shape with the black boundaries comprises the first portion of the image associated with the special mark.

14. The method of claim 8, further comprising, prior to applying character recognition to the second portion of the image associated with the label, extracting the second portion of the image associated with the label from the image.

15. A computer program product, the computer program product being embodied in a non-transitory computer readable storage medium and comprising computer instructions for:
 obtaining an image;
 determining a first portion of the image associated with a special mark;
 determining a second portion of the image associated with a label based at least in part on the first portion of the image associated with the special mark, wherein determining the second portion of the image associated with the label based at least in part on the first portion of the image associated with the special mark includes searching for the second portion of the image associated with the label in an area of the image near a location of the first portion of the image associated with the special mark; and
 applying character recognition to the second portion of the image associated with the label to determine a value associated with the label.

16. The computer program product of claim 15, wherein the image is obtained based at least in part on one or more of the following: receiving the image via a camera, receiving the image via a scanner, and downloading the image.

17. The computer program product of claim 15, wherein the image is associated with one or more products.

18. The computer program product of claim 17, wherein the label includes identifying information associated with the one or more products.

19. A system, comprising:
 one or more processors configured to:
  obtain an image;
  determine a first portion of the image associated with a special mark, wherein to determine the first portion of the image associated with the special mark includes to:
   detect in the image a shape with black boundaries associated with a special mark pattern;
   compare content enclosed by the black boundaries to a designated content associated with the special mark pattern; and
   in the event that the content enclosed by the black boundaries matches the designated content, determine that a portion of the image including the shape with the black boundaries comprises the first portion of the image associated with the special mark;
  determine a second portion of the image associated with a label based at least in part on the first portion of the image associated with the special mark; and
  apply character recognition to the second portion of the image associated with the label to determine a value associated with the label; and
 one or more memories coupled to the one or more processors and configured to provide the one or more processors with instructions.

20. A method, comprising:
 obtaining an image;
 determining, using one or more processors, a first portion of the image associated with a special mark, wherein determining the first portion of the image associated with the special mark includes:
  detecting in the image a shape with black boundaries associated with a special mark pattern;
  determining whether a line of pixels within the black boundaries matches a black-white pixel ratio associated with the special mark pattern; and
  in the event it is determined that the line of pixels within the black boundaries matches the black-white pixel ratio associated with the special mark pattern, determining that a portion of the image including the shape with the black boundaries comprises the first portion of the image associated with the special mark;
 determining a second portion of the image associated with a label based at least in part on the first portion of the image associated with the special mark; and
 applying character recognition to the second portion of the image associated with the label to determine a value associated with the label.

* * * * *

UNITED STATES PATENT AND TRADEMARK OFFICE
CERTIFICATE OF CORRECTION

| | | |
|---|---|---|
| PATENT NO. | : 8,971,620 B2 | Page 1 of 1 |
| APPLICATION NO. | : 14/021564 | |
| DATED | : March 3, 2015 | |
| INVENTOR(S) | : Lun Zhang | |

It is certified that error appears in the above-identified patent and that said Letters Patent is hereby corrected as shown below:

In the Specification
Column 5, line 19
Delete "Process 200" and insert -- Process 300 --

Signed and Sealed this
Twenty-ninth Day of March, 2016

Michelle K. Lee
*Director of the United States Patent and Trademark Office*